Dec. 29, 1936.  C. W. HITT  2,066,004
APPARATUS FOR MAKING TUBES
Filed July 24, 1935
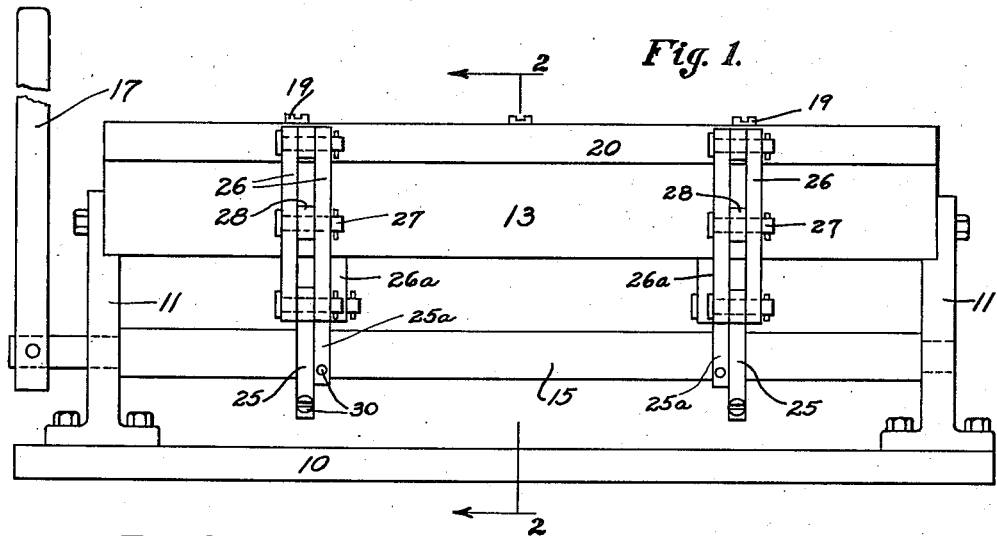
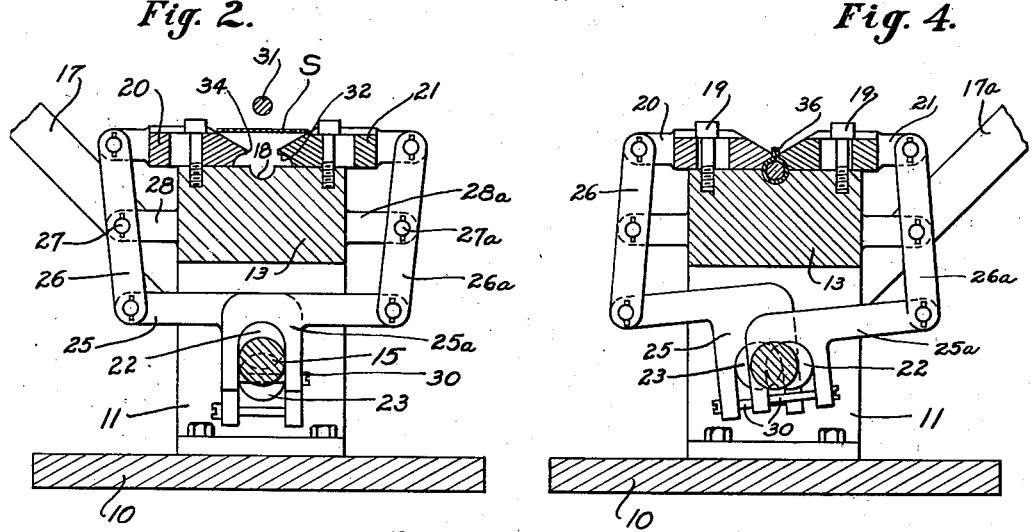
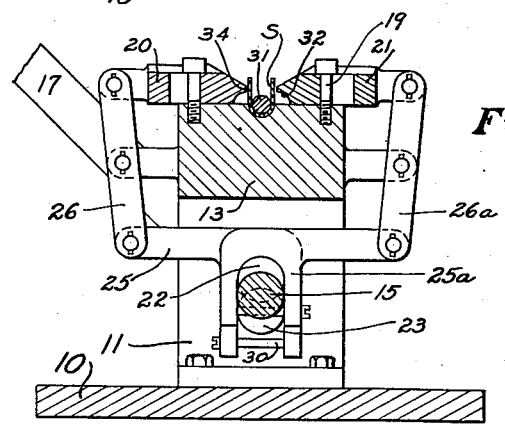
CHARLES W. HITT
INVENTOR
BY *J. W. Rodgers*
ATTORNEY Patented Dec. 29, 1936

2,066,004

UNITED STATES PATENT OFFICE 2,066,004

APPARATUS FOR MAKING TUBES

Charles W. Hitt, Los Angeles, Calif., assignor to John A. Zublin, Los Angeles, Calif.

Application July 24, 1935, Serial No. 32,934

2 Claims. (Cl. 153—34)

The present invention relates to apparatus for making from sheet metal the thin-wall tubes described in my copending application entitled "Tube and method of making same", Serial No. 32,908 filed on even date herewith. These tubes may be used for various purposes, such as structural members or as containers.

The operation of forming tubes from very thin sheet metal is attended by many difficulties because the stock is of such small cross section it lacks sufficient strength to withstand being pushed or pulled through long forming dies with high friction. Also, if the tube is closed by welding a conventional lap or butt joint, the welding flame frequently burns entirely through the metal and irreparably damages the tube.

Thus it is a general object of my invention to provide means for forming a tube from a very thin sheet metal strip without danger of breaking or misforming the strip during the manufacture of the tube.

It is also an object to provide apparatus for forming a tube joint that can be sealed easily and rapidly by welding methods without burning through the tube walls.

Another object of the invention is to devise apparatus which will expose the joint to permit welding of the seam and at the same time cover the tube to protect its walls from the welding flame.

It is a further object to devise means for forming tubes such that the tubes may be completed and then filled, or, if the contents permits, the filling can be placed within the tube during its formation.

An additional object is to make thin-wall tubes cheaply and economically in commercial quantities without the necessity of expensive equipment.

These objects are accomplished in a preferred form of my invention by providing a die block with a forming groove in one face, over which two opposed forming members are movable toward the forming groove, by any suitable means, to bend the entire length of tube about an internal mandrel, which is removable. The forming members shape the tube around the mandrel in such a manner as to form the parallel edge portions of the strip into flanges which are brought into contact. The longitudinal upstanding seam so formed is then welded to seal the tube while the seam is still gripped between the opposed forming members.

How the above and other objects are attained will be better understood from the following description and the annexed drawing, in which:

Fig. 1 is a side elevation of a tube-forming device for making tubes according to my invention;

Fig. 2 is a vertical section on line 2—2 of Fig. 1, showing a flat strip overlying the die groove;

Figs. 3 and 4 are views similar to Fig. 2 showing subsequent steps in forming a tube.

The apparatus shown in side elevation in Fig. 1 comprises a base 10 carrying a pair of uprights 11 which support between them die block 13. Extending longitudinally of the base and journalled in the two uprights 11 is cam shaft 15 which is rocked by handle 17 or other suitable means.

As may be seen from Fig. 2, the top face of block 13 has a central longitudinal die groove 18, and a pair of forming members 20 and 21 are slidably mounted on top of the block to move toward the groove. Guide pins 19 pass through slots in the forming members to keep the forming members parallel to the groove and moving perpendicularly to it.

To move these forming members, cam shaft 15 is provided with one or more similar pairs of cams, two pairs being used here. The pair at the left end of Fig. 1 comprises two circular eccentrics 22 and 23 spaced 180° apart on shaft 15, as in Fig. 2. Cam 23 is operatively connected to member 20 by a linkage that includes yoke follower 25 connected at its outer end to lever 26. Lever 26 is pivoted at its mid-point 27 to arm 28 on block 13 and is connected at its upper end to member 20. Cam 22 is operatively connected to member 21 by a similar linkage that includes yoke follower 25a and lever 26a pivoted at 27a to arm 28a. The open lower ends of the follower yokes are closed, as by screws 30, to hold the yokes on the cams.

The other pair of cams and the associated linkages at the right end of Fig. 1 are exactly like the parts just described.

When the two forming members are in the separated or open position of Fig. 2, the centers of cams 22 and 23 are located one above and the other below the center of shaft 15 as shown. When shaft 15 is rocked approximately 90° by means of operating lever 17, the cams move followers 25 and 25a horizontally and oppositely so that forming members 20 and 21 are moved positively and equally toward one another over the face of die block 13 and toward forming groove 18. The forming members then ocupy the advanced position shown in Fig. 4, with the cam shaft handle at 17a. When handle 17 is returned to the original position, the cams positively move followers 25 and 25a to spread apart the forming members.

In order to make a tubular container from a single flat strip S of thin metal, the thickness of which is exaggerated for purposes of illustration, the strip is first placed in a position overlying forming groove 18, as shown in Fig. 2. Then the central portion of this strip is pressed into the groove by means of a core or mandrel 31 which, as it moves from the position of Fig. 2 to that of Fig. 3, forces the strip S down into the groove until it is bent into a U-shape, as in Fig. 3, with the upstanding sides of the strip generally parallel and extending upwardly beyond the top surface of die block 13. Mandrel 31 is preferably manipulated by hand, though suitable mechanism may be provided if desired. The mandrel is circular in cross section since it is desired that the final tube be of this shape, though it will be realized that both the mandrel and groove may be of any shape which it is desired to impart to the finished tube.

Next, handle 17 is moved to the position 17a of Fig. 4, thus rocking the cam shaft through approximately a quarter revolution and moving forming members 20 and 21 together into the position of Fig. 4 to bend the upstanding edges of metal strip S around mandrel 31 to form a completed tube. Since groove 18 is only a semi-cylinder, the forming members are undercut at their forward faces at 32, so as to conform to the shape of mandrel 31 and the tube formed over it. Just above this undercut portion these forming members have gripping faces 34 which bring the up-standing sides of the U-shape strip into contact so that when the tube is completed around mandrel 31, edge portions 36 of the strip sides are parallel, as originally, and in contact (Fig. 4). The longitudinal edge portions or flanges at 36 now extend outwardly away from the tube and lie in parallel, substantially radial planes.

The forming members are kept in advanced position to grip the strip edges between faces 34, during the time the tube is sealed by running a welding torch along the longitudinal strip edges to weld together portions 36 which are exposed above the forming members. Flanges 36 extend outwardly away from the tube a sufficient distance that the metal will not all burn away at any point as the welding torch moves along. By welding the upstanding seam while the forming members are in advanced position, the sheet edges are held against separation before the weld is complete, the large mass of members 20, 21 quickly chills the weld, and the thin walls of the container are protected by members 20, 21 against the torch flame.

Finally, members 20 and 21 are retracted and the tube and mandrel are removed from the die block. The tube is then stripped from the mandrel, leaving a hollow tube. If used as a container, the tube is crimped at one end, filled with any suitable material, and then crimped at the other end to hold the enclosed contents.

As an alternative procedure, bending the flat strip metal into U-shape may be done in another similar die block. Die block 13 then receives this pre-formed U-strip with mandrel 31, and the tube is completed as described above.

As another variation, mandrel 31 may be removed after the U-shape strip is formed, leaving the strip in groove 18, or a pre-formed U-strip alone may be inserted in groove 18. In place of the mandrel there is substituted the material which it is desired to enclose within the tube, this material being present in such quantity that the container may be bent about the contents to shape the tube when the sliding forming members are moved together over the die groove. The tube is finished by crimping the ends and welding the longitudinal edges as described.

With this device it is possible to form a container from very thin sheet metal of gauges too thin to be handled by the usual methods and apparatus. The advantage of my invention is more readily apparent when it is realized that tubes are made with unfailing success from stock as thin as .001 inch, whereas conventional methods and devices for tube forming fail since they tear the stock, and welding the conventional lap seam inevitably results in a large proportion of tubes ruined by burning holes through the wall. Naturally, the invention may also be applied to heavier gauges, but is especially advantageous for handling very thin stock.

I have described a simplified preferred form of a device embodying my invention, but it will be realized many changes may be made by those skilled in the art. Thus, the operations may be performed by successive mechanisms or by automatic or semi-automatic mechanisms without departing from the fundamental structure herein described. Consequently, it is desired that the foregoing description be considered as illustrative of rather than restrictive upon the broader aspects of my invention as set out in the appended claims.

I claim as my invention:

1. In apparatus for forming tubes from very thin metal stock, the combination of a stationary die block having a groove in one surface adapted to form a strip of metal stock into a U-shape with parallel sides extending out from said surface; a pair of forming members sliding on the die block toward the groove, said forming members having means for forming the metal strip into a tube and also having means for bringing into contact edge portions of the parallel strip sides and for holding the edge portions parallel and in contact with a part thereof fully exposed out beyond the faces of the forming members for the entire length of the tube while the forming members fully cover the tube itself, whereby the edge portions may be welded together in parallel position to complete the tube without injury to the tube; and means for moving the forming members.

2. In apparatus for forming tubes from very thin metal stock, the combination of a stationary die block with a groove in one face; a mandrel movable into said groove to press a strip of metal stock over-lying the groove into a U-shape with parallel sides extending out from the die block face; a pair of forming members sliding on the die block toward the groove and having means for bending the metal strip about the mandrel to form a tube, said forming members also having means for bringing edge portions of the parallel strip sides into parallel contacting position and for holding the edge portions parallel and in contact with a part thereof fully exposed out beyond the faces of the forming members for the entire length of the tube while the forming members fully cover the tube itself, whereby the edge portions may be welded together in parallel position to complete the tube without injury to the tube; and means for moving the forming members.

CHARLES W. HITT.